Oct. 4, 1932.  J. C. McCUNE  1,881,210
HOLD-BACK VALVE DEVICE
Filed Sept. 20, 1930
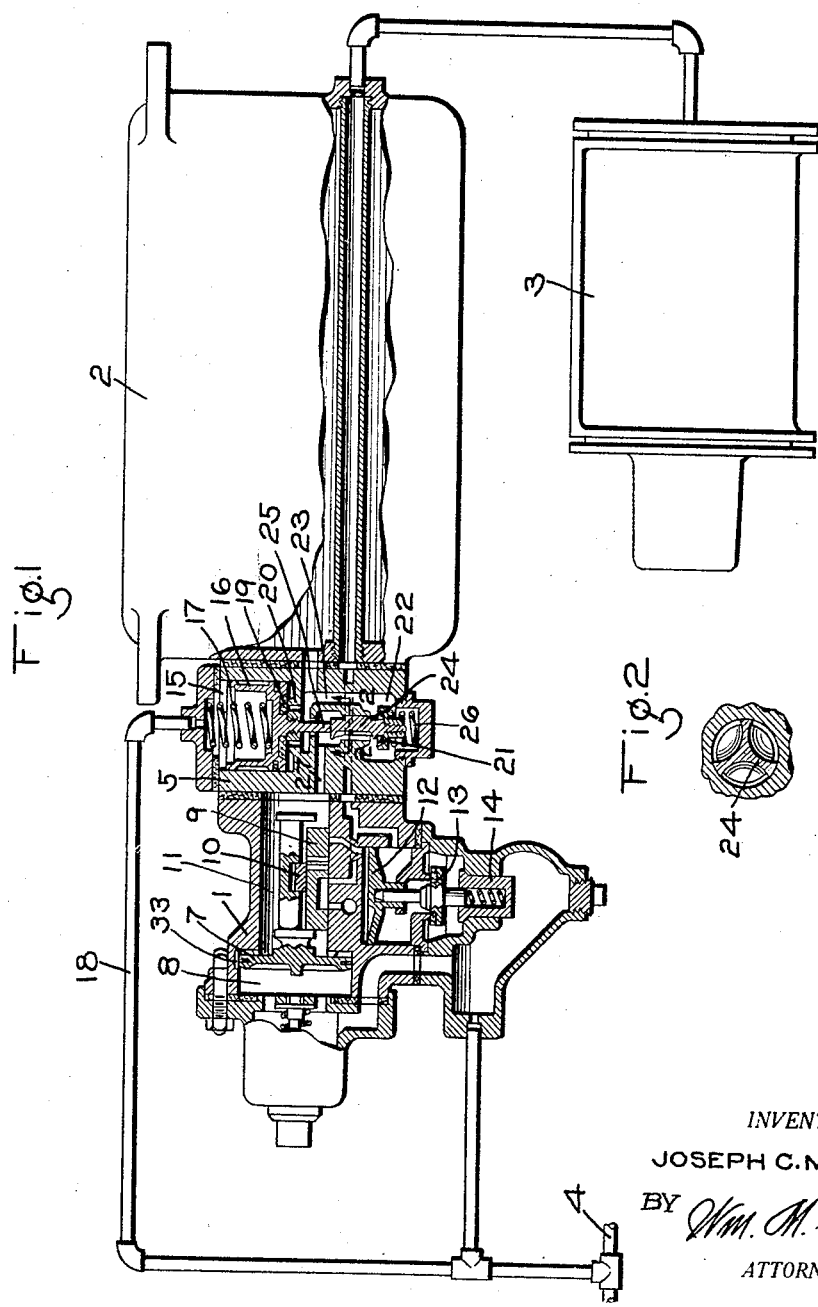
INVENTOR.
JOSEPH C. McCUNE
BY Wm. M. Cady
ATTORNEY.

Patented Oct. 4, 1932

1,881,210

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

HOLD BACK VALVE DEVICE

Application filed September 20, 1930. Serial No. 483,203.

This invention relates to fluid pressure brakes, and more particularly to a fluid pressure brake equipment in which an emergency application of the brakes is effected upon a sudden reduction in brake pipe pressure.

When an emergency application of the brakes is effected, either by moving the engineer's brake valve to emergency position or by a rupture of the brake pipe, the brakes on the cars adjacent to the point at which the sudden reduction in brake pipe pressure is initiated, are applied with great force in advance of the application of the brakes on the other cars of the train. This is liable to cause a pull in two of the train or an internal collision, due to the running in or out of the slack in the train.

One object of my invention is to provide means for holding back or delaying the application of the brakes on cars adjacent to the point where a sudden reduction in brake pipe pressure is initiated.

Other objects and advantages will appear in the following more detailed description of the invention.

In the accompanying drawing; Fig. 1 is a diagrammatic view, partly in section, of a car fluid pressure brake equipment embodying my invention; and Fig. 2 a section on the line 2—2 of Fig. 1.

The fluid pressure brake equipment shown in Fig. 1 comprises a triple valve device 1, an auxiliary reservoir 2, a brake cylinder 3, a brake pipe 4, and a hold back valve device 5.

The triple valve device 1 may comprise the usual parts including a piston 7 contained in piston chamber 8, which chamber is connected to the brake pipe 4, and a main slide valve 9 and a graduating slide valve 10 adapted to be operated by piston 7, and contained in a valve chamber 11, which is connected to the auxiliary reservoir 2.

The triple valve casing also contains a quick action valve device comprising a piston 12, a vent valve 13 adapted to be operated by said piston, and a check valve 14.

The hold back valve device 5 comprises a casing, which may be interposed between the triple valve device 1 and the auxiliary reservoir 2, and having a piston chamber 15 containing a piston 16 subject to the pressure of a coil spring 17. The piston chamber 15 is connected by pipe 18 to the brake pipe 4 and the piston 16 has a seat ring 19 at one side adapted to engage a seat rib 20, the exposed area of the piston within the seat rib 20 being exposed to auxiliary reservoir pressure.

A valve 21 contained in valve chamber 22, which is open to the auxiliary reservoir 2 through passage 23, is provided with a winged section 24, and a stem 25, carried by piston 16 is adapted to engage said member. The valve 21 is acted upon by a spring 26, which urges said valve to its seat. The stem 25 extends through an opening in a partition wall of the hold back valve casing and said opening is such as to provide a restricted flow communication from the auxiliary reservoir 2 to passage 27, leading to valve chamber 11.

In operation, when the brake pipe 4 is charged with fluid under pressure, fluid flows from the triple valve piston chamber 8 through the usual feed groove 33 around the triple valve piston 7, charging the valve chamber 11 and the auxiliary reservoir 2 with fluid under pressure.

Fluid under pressure in the brake pipe flows through pipe 18 to piston chamber 15 of the hold back valve device and the auxiliary reservoir pressure acting on the inner seated area of the piston 16 being equal to the brake pipe pressure, the piston 16 is held seated on the seat rib 20 by spring 17. The valve 21 is thus normally held unseated, so that a large opening is provided to permit flow of fluid from the auxiliary reservoir 2 to the valve chamber 11, by way of passage 23, past the open valve 21, to passage 27.

When a sudden reduction in brake pipe pressure is initiated, either by moving the engineer's brake valve to emergency position or by a rupture of the brake pipe, the triple valve piston 7 is moved out to emergency application position to effect an emergency application of the brakes in the usual manner.

The force of the spring 17 acting on piston 16 is such that a sufficient differential of pressures to move the piston from its seat will not be obtained except when the rate of reduction in brake pipe pressure is substantially greater than that required to move the triple valve piston to emergency position.

The required differential pressure is only obtained on cars adjacent to the point at which the sudden reduction in brake pipe pressure is initiated. On such cars, the piston 16 will be moved from its seat, permitting the valve 21 to seat so as to cut off communication from the auxiliary reservoir to the valve chamber 11, by way of the large opening including the passage 23. With the valve 21 seated, fluid under pressure can only flow from the auxiliary reservoir 2 to valve chamber 11 by way of the restricted communication provided around the stem 25. As a result of the restricted flow of fluid from the auxiliary reservoir, the triple valve devices, on cars adjacent to the point at which the sudden reduction in brake pipe pressure is initiated, are prevented from effecting a sudden build up of brake cylinder pressure.

This hold back of the building up of pressure in the brake cylinders on cars adjacent to the point at which the sudden reduction in brake pipe pressure is initiated, provides time for the brakes to be applied on the other cars of the train, so that the train is not pulled in two nor do internal collisions occur, due to the running in and out of the slack in the train.

After a time, the fluid pressures on opposite sides of the piston 16 equalize sufficiently to permit the spring 17 to return the piston 16 to its seat, so that the valve 21 is again unseated, permitting the usual flow of fluid from the auxiliary reservoir to the valve chamber 11.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, auxiliary reservoir, brake cylinder, and an equalizing valve device operated upon a reduction in brake pipe pressure for supplying fluid under pressure from the auxiliary reservoir to the brake cylinder, of means operated upon an emergency rate of reduction in brake pipe pressure exceeding a predetermined rate for restricting the flow of fluid from the auxiliary reservoir to said brake cylinder.

2. In a fluid pressure brake, the combination with a brake pipe, auxiliary reservoir, brake cylinder, and an equalizing valve device operated upon a reduction in brake pipe pressure for supplying fluid under pressure from the auxiliary reservoir to the brake cylinder, of means operated only when the rate of reduction in brake pipe pressure is higher than a predetermined emergency rate for restricting communication through which fluid is supplied from the auxiliary reservoir to said brake cylinder.

3. In a fluid pressure brake, the combination with a brake pipe, auxiliary reservoir, brake cylinder, and an equalizing valve device movable to emergency position upon a sudden reduction in brake pipe pressure, in which fluid under pressure is supplied from the auxiliary reservoir to the brake cylinder, of valve means operated only when the sudden reduction in brake pipe pressure is at a predetermined high rate for restricting communication through which said equalizing valve device supplies fluid from the auxiliary reservoir to the brake cylinder.

4. In a fluid pressure brake, the combination with a brake pipe, auxiliary reservoir, brake cylinder, and an equalizing valve device operated upon a reduction in brake pipe pressure for supplying fluid under pressure from the auxiliary reservoir to the brake cylinder, of a valve mechanism having a restricted opening and also a large opening through which fluid is supplied from the auxiliary reservoir to said equalizing valve device and comprising a valve operable to close communication through said large opening, and a movable abutment subject to the opposing pressures of the brake pipe and the auxiliary reservoir for controlling the operation of said valve.

5. In a fluid pressure brake, the combination with a brake pipe, auxiliary reservoir, brake cylinder, and an equalizing valve device operated upon a reduction in brake pipe pressure for supplying fluid under pressure from the auxiliary reservoir to the brake cylinder, of a valve mechanism having a restricted opening and also a large opening through which fluid is supplied from the auxiliary reservoir to said equalizing valve device and comprising a valve operable to close communication through said large opening, a spring, and a movable abutment subject on one side to auxiliary reservoir pressure and on the opposite side to the opposing pressures of the brake pipe and said spring for controlling the operation of said valve.

In testimony whereof I have hereunto set my hand, this 18th day of September, 1930.

JOSEPH C. McCUNE.